(12) United States Patent
Meller (10) Patent No.: US 8,611,710 B2
(45) Date of Patent: Dec. 17, 2013

(54) OPTICAL COLLECTOR AND DEVICE WITH OPTICAL COLLECTOR

(75) Inventor: Dieter Meller, Alfter (DE)

(73) Assignee: GAPI Technische Produkte GmbH, Rösrath (DE)

( * ) Notice: Subject to any disclaimer, the term of this patent is extended or adjusted under 35 U.S.C. 154(b) by 805 days.

(21) Appl. No.: 12/726,487

(22) Filed: Mar. 18, 2010

(65) Prior Publication Data

US 2010/0239208 A1 Sep. 23, 2010

(30) Foreign Application Priority Data

Mar. 18, 2009 (DE) .......................... 10 2009 013 821

(51) Int. Cl.
*G02B 6/26* (2006.01)
*G02B 6/42* (2006.01)

(52) U.S. Cl.
USPC ............................................................. 385/31

(58) Field of Classification Search
USPC ............................................................. 385/31
See application file for complete search history.

(56) References Cited

U.S. PATENT DOCUMENTS

| | | | |
|---|---|---|---|
| 4,379,613 A | 4/1983 | Coburn | |
| 4,389,085 A * | 6/1983 | Mori | 359/591 |
| 4,697,867 A | 10/1987 | Blanc et al. | |
| 4,746,185 A * | 5/1988 | Shahidi-Hamedani | 385/39 |
| 4,923,276 A | 5/1990 | Wells | |
| 5,117,478 A | 5/1992 | Cobb, Jr. et al. | |
| 5,751,870 A | 5/1998 | Forkner et al. | |
| 5,791,898 A | 8/1998 | Maissami | |
| 7,486,859 B2 * | 2/2009 | Oney | 385/39 |
| 2002/0171950 A1 | 11/2002 | Plank et al. | |

FOREIGN PATENT DOCUMENTS

| | | |
|---|---|---|
| DE | 1221933 B | 7/1966 |
| DE | 10124367 A1 | 12/2002 |
| EP | 0115843 A2 | 8/1984 |
| EP | 0534853 A1 | 3/1993 |

OTHER PUBLICATIONS

International Search Report.

* cited by examiner

*Primary Examiner* — Ryan Lepisto
*Assistant Examiner* — Jerry Blevins
(74) *Attorney, Agent, or Firm* — Panitch Schwarze Belisario & Nadel LLP (57) ABSTRACT

An optical collector includes an optical input for incoupling light from multiple incoming optical waveguides into the collector and an optical output for outcoupling light from the collector into an outgoing optical waveguide. The collector includes an optical body having a base portion in which the optical input including at least two coupling points is arranged, and a tip portion in which the optical output including a second coupling point is arranged, wherein the first coupling points each include an optical input cross-sectional area and the second coupling point comprises an output cross-sectional area, and wherein the output cross-sectional area is smaller than the total of all input cross-sectional areas. The optical body of the collector can be cone-shaped and may include a hollow cone.

19 Claims, 7 Drawing Sheets

OPTICAL COLLECTOR AND DEVICE WITH OPTICAL COLLECTOR

BACKGROUND OF THE INVENTION

The present invention relates to an optical collector including an optical input for incoupling light from multiple incoming optical waveguides into the collector and an optical output for outcoupling light from the collector into an outgoing optical waveguide. The present invention also relates to a photo-optical device including the optical collector.

It is known to funnel optical waveguides by applying special techniques. But this is mostly limited to very few optical waveguides to be funneled and is technically complex. Moreover, the cross sections of the funneled waveguides are limited and are subject to narrow restrictions concerning the outgoing optical waveguide, since even the cross section of the outgoing optical waveguide cannot be any size. Furthermore, optical waveguides shall be funneled with the light loss in the connection area being as small as possible. On the other hand, there is a need for extending the possibilities for the connection of multiple optical waveguides, thus opening also new application areas.

BRIEF SUMMARY OF THE INVENTION

The present invention is therefore based on the object of providing a collector of the above-mentioned type, which has a simple construction and is easy to manufacture on the one hand and provides flexibility of use and solves the above-mentioned problems on the other hand.

The above object is achieved by a collector as defined by the independent claim(s) of the present application. Advantageous further developments are described in the dependent claims.

Specifically, the above object is achieved by the collector including an optical body having a base portion in which the optical input including at least two first coupling points is arranged, and a tip portion in which the optical output including at least one second coupling point is arranged, by the first coupling points (in the following also referred to as incoupling points) each including an optical input cross-sectional area and the second coupling point (outcoupling point) including an output cross-sectional area, and by the output cross-sectional area being smaller than the total of all input cross-sectional areas.

Light can thus be coupled into the wider base portion of the optical body and is preferably continually focused in the tip portion and/or on its way from the base portion to the tip portion and is outcoupled in the tip portion. Here, the light can be focused and outcoupled in the tip portion and focusing and outcoupling can take place substantially simultaneously or in places separate from each other. The focusing may be related to that the total cross section of the light-conducting areas of the collector tapers in the main propagation direction of the light, with the energy density (light density) in the light-conducting areas of the collector being allowed to remain at least substantially constant in that case and the light-conducting areas being geometrically funneled, and/or to that the energy density of the transmitted light is increased by the focusing. In the first case, an increase of the energy density by focusing can at least substantially take place only at the time of coupling the light into the outgoing optical waveguide. Preferably, the focusing of the light takes place continuously through the propagation of the light in the tapering optical body. Outcoupling can take place in the region of maximum focusing.

It shall be assumed that the optical body generally is the light-conducting body as far as the incoupled light is concerned. The optical body can comprise an additional body or regions which are not light-conducting, at least substantially, or into which light from the incoupling points is practically not incoupled directly or indirectly. The light-conducting and the light non-conducting regions can for example have different optical properties such as refraction indices, transmission coefficients etc. or they can be separated from each other by such regions. Preferably, the optical body virtually completely consists of light-conducting regions into which light is coupled.

The optical body which tapers from the base portion to the tip portion can be configured for instance in a funnel-like fashion, especially conically, pyramid-like, key-shaped or in any other suitable way. The tapering can be continuous and in particular constant or uniform in the main propagation direction of the light. This preferably applies in the same manner to all light-conducting paths of the body or to all light-conducting paths of a group of light-conducting paths. The groups of light-conducting paths can be different from each other by the geometry of the light-conducting path within the optical body, for example by the angle to the longitudinal axis of the optical body, e.g. when the body has a pyramidal shape and light is coupled into the corner regions or edge centers of the pyramid.

Thus, the coupled light can be guided in the direction of the funnel-shaped tapering in the optical body and focused. The direction of incoupling into the optical body and the direction of outcoupling into the end portion of the outgoing optical waveguide can be the same here, at least substantially, thus achieving a high efficiency of the collector. Generally, the main propagation direction of the light in the collector can be at least substantially linear with respect to the light which is incoupled through at least one or all of the coupling points.

If necessary, also the optical output, after having been modified, can comprise in the tip portion an optical reflecting device bundling and focusing the incoupled light and transmitting the light to the outcoupling point of the collector through which the light is coupled into the end portion of the outgoing optical waveguide. Thus, the light can be fed into the collector through the first coupling points in the incoupling direction towards the tip portion, reflected in the tip portion towards the output in the base portion by reflectors like parabolic mirrors or other reflecting devices and preferably focused into the base portion so that the collected light can be outcoupled on the base side of the collector. The optical output can be provided in a geometrical center of the base portion. The deflecting device is capable of deflecting the light incoupled through one, several or preferably all of coupling points towards the outcoupling point. This allows the collector being adapted to different three-dimensional conditions.

For guiding the light in the optical body, the same can be defined by two at least approximately parallel light-conducting lateral faces which extend from the base portion to the tip portion or whose distance to each other increases from the base portion to the tip portion. The light is then radiated through the incoming optical waveguide into between the two light-conducting lateral faces and guided towards the tip portion. This avoids the light from spreading inside the collector back to the coupling point through multiple reflections as they occur in a significantly tapering light-conducting path. The light-conducting lateral faces can be inclined to each other at an angle of ≤20-30° or ≤10-15° or ≤5° which expands towards the tip portion. Preferably, the light-conducting surfaces are arranged at least approximately parallel to the incoupling direction of the first coupling points respectively associated to the same. If necessary, the distance of the light-conducting lateral faces can also decrease towards the tip portion, to which end the lateral faces can include an angle of ≤20-30° or ≤10-15° or ≤5° to each other, even though this is not preferred. The light-conducting lateral faces can be arranged as an extension of the incoming optical waveguides.

Advantageously, the light-conducting surfaces are designed so as to afford a preferably loss-free total reflection of the light that is supplied. Preferably, at least the first coupling points are arranged between the light-conducting lateral faces in such a manner that they couple light into between the light-conducting lateral faces. The light-conducting surfaces can respectively constitute the boundary surfaces of the optical body which is made of light-conducting material. Where necessary, the light-conducting surfaces can generally also be surrounded by non-conducting regions or bodies, so that the same do not or not completely constitute the physical boundary surfaces of the collector, for instance also for the purpose of mechanically stabilizing the collector or protecting the collector against external influences.

The narrow sides of the optical body which are delimited by the light-conducting lateral faces can be designed so as to minimize outcoupling of light. They can be provided for instance with a reflective coating or any other suitable coating or they can closely converge towards the outside, so that the light is reflected back into the body under a multiple total reflection.

The light-conducting lateral faces can define a wall made of light-conducting material and having a wall thickness that may be constant over the extension of the collector from the base portion to the tip portion, at least substantially, or which increases towards the tip portion. Preferably, the optical input cross section of the first coupling points respectively extends over almost the entire wall thickness, thus allowing a major light stream being fed into the wall. The regions between neighboring coupling points can have a cross sectional geometry or nature suitable for avoiding undesired outcoupling of light in these regions.

Preferably, the optical body is cone-shaped, particularly circular cone-shaped or also cone-shaped with a closed arcuate, oval, polygonal or other suitable base and includes an outer lateral surface of a cone. The optical body can be designed as a cone or a truncated cone and, in the case of a pyramidal shape, also as a truncated pyramid. Preferably, the optical body is designed as a right cone and, where appropriate, also as oblique cone.

Preferably, the optical body generally includes an inner and an outer lateral surface as light-conducting surfaces, between which light is incoupled through the first coupling points and which define the light-conducting region of the optical body radially inwards and radially outwards.

Particularly preferably, the optical body is defined by two light-conducting lateral faces designed as lateral surfaces of a cone, the outer lateral surface and a first inner lateral surface, wherein the first inner lateral surface can form a hollow cone or cone that tapers towards the tip portion and is made of a material which is not penetrated by light, at least substantially, and which can have a depth towards the tip portion of ≥one to two times or ≥three to four times the diameter of the cross sections of the first coupling points. The inner and the outer lateral surfaces are preferably arranged coaxially or concentrically to each other, at least approximately, so that a constant distance between the same and a constant wall thickness are produced, which can generally apply to the inner and outer lateral surfaces. The first inner lateral surface can represent a geometrical boundary surface of the optical body, so that this boundary surface on its part defines a recess which extends from the base portion to the tip portion in a conically tapering fashion. Preferably, these two lateral surfaces each have an apex angle which is at least approximately equal. Thus the first outer and first inner lateral surfaces can define a hollow cone-shaped optical body by the wall.

The first coupling points can each have an incoupling direction for coupling the light into the collector, the incoupling direction being at least approximately parallel to the outer and/or inner (cone) lateral surfaces. The incoupling direction can deviate in its amount from the outer and/or inner (cone) lateral surfaces or from the inner and/or outer light-conducting lateral faces, preferably from the inner light-conducting lateral face towards a larger angle and, independently thereof, from the outer light-conducting lateral face towards a smaller angle, by ≤20-30° or ≤15°, preferably ≤5-10°. Where appropriate, the deviation to the inner light-conducting lateral face can also be towards a smaller angle and/or (independently of each other) to the outer light-conducting lateral face also towards a larger angle. The deviation towards the inner and/or outer light-conducting lateral face can independently be in the range of ±20-30° or ±15° or preferably ±5-10°. This can apply within the scope of the invention independently of the design of the inner and/or outer light-conducting surface as a (cone) lateral surface. The incoupling direction in terms of the invention generally is the main propagation or spreading direction of the light coupled into the collector. Where appropriate, the optical body can be designed as cone segment.

Where appropriate, the optical body can also be designed substantially plate-like with a segment-of-a-circle-like, fan-like or key-like contour, wherein the plate-like lateral faces can be designed as light-conducting lateral faces and can be preferably arranged approximately plane-parallel. Here the base portion can be constituted by a radially outer, preferably (circular) arc-shaped peripheral portion including the first coupling points, and the tip portion can be constituted by a radially inner, preferably (circular) arc-shaped peripheral portion including the second coupling point. For an improved light conduction, recesses or slots radially inwardly extending from the outer peripheral portion can be provided. These can preferably taper in a key-like fashion, so that starting from the first coupling points respectively and over the extension of the slots, a light-conducting channel with mutually parallel lateral walls is formed.

For a preferably loss-free incoupling, the input cross-sectional area of at least one or all of the first coupling points, i.e. the "entry window" of the coupling points, is arranged substantially perpendicular to the light incoupling direction assigned to the respective coupling point. Preferably, the first coupling points each have a longitudinal center line that is arranged perpendicularly and centrally with respect to the input cross-sectional area of the respective coupling point.

The second coupling point can include a seat for an end portion of the outgoing optical waveguide. The end portion can be fixed in the seat, for example by means of an adhesive, or can be otherwise supported in the seat, e.g. by external holding means. The seat can include a receiving space having a base plane forming the output cross sectional plane. Preferably, the receiving space tapers from the base plane in a direction towards the base portion of the collector. For adaption to the receiving space, the end portion of the outgoing optical waveguide can also be designed in a tapering fashion.

Preferably, the outgoing optical waveguide is adapted with its end portion to the shape of the receiving space. Preferably, it can be coupled, applied against or directly connected to the seat of the optical body in a precisely fitting fashion and ideally over its full area, so that losses during the transmission of the light from the optical body to the outgoing optical waveguide can at least be minimized. The boundary surface of the receiving space and the end portion of the outgoing optical waveguide are preferably designed congruently. Between the end portion of the outgoing optical waveguide and the seat of the collector there is preferably left only a small or practically no air gap. Where appropriate, a translucent material can be arranged between the end portion and the seat, the refraction index of the translucent material corresponding to that of the optical body or the outgoing optical waveguide or being smaller than these. Preferably, such a material (with the exception of air) is not present. The peripheral boundary surface of the receiving space towards the collector can be smaller than the total of all input cross-sectional areas.

Particularly preferably, the second coupling point is designed in a manner or provided with means which compared to an optically continuous light-conducting path which is made of the light-conducting material of the optical body of the collector but otherwise has the same cross section, reduce or minimize entry of back-scattered light from an outgoing optical waveguide coupling to the second coupling point back into the optical collector. To this end, the connection of the end portion of the outgoing optical waveguide and the boundary surface of the collector seat can generally be so as to produce an optically effective connection surface there between which at least conducts substantially vertical incident light, but on which light incident at an angle smaller than the critical angle of total reflection is totally reflected. This can be achieved by the above-described connection of the two components. Light which is already coupled into the end portion of the outgoing optical waveguide and incident under a suitable angle on the connection surface is thus coupled back into the outgoing optical waveguide, e.g. under total reflection into the end portion and further reflected back into the outgoing optical waveguide. Thus, the light is not outcoupled back again into the collector and/or radiation through the end portion from one side of the outcoupling surface or the receiving space into the opposite side of the same is prevented. This clearly increases the efficiency of the collector. Where appropriate, this effect can be produced or increased alternatively or additionally by other measures like a suitable, e.g. semi-transparent reflective coating or a translucent coating of the end portion of the outgoing optical waveguide and/or the peripheral boundary surface of the receiving space of the collector (which boundary surface can represent a second inner (cone) lateral surface area). Such measures allow under certain circumstance that even the end portion of the outgoing optical waveguide is integrally connected to the collector and designed for instance as a preferably axial appendix pointing outwards. This connection surface or "mirror-coated" surface can constitute the outcoupling surface of the collector or of the optical body.

The receiving space for the end portion can be designed (circular) cone-shaped or pyramidal or polygonal, and the output cross-sectional plane of the collector can constitute the base plane of the receiving space. The receiving space can taper towards the base portion of the collector or towards the first coupling point and is preferably free of undercuts. The receiving space can have one or more lateral boundary surfaces, the number of which can correspond to the number of the first coupling points. Preferably, a completely continuous boundary surface is given which preferably does not have any edges or lateral projections. The boundary surface(s) or the regions of the same each can be at least substantially perpendicular to the incoupling direction of the associated first coupling point or propagation direction e' of the light incident on the boundary surfaces (the direction of propagation corresponding to the direction of outcoupling from the optical body), wherein the receiving space can be geometrically completely determined by these boundary surface(s) or by an envelope of the same. The lateral faces of the receiving space can thus be polygonal or represent peripheral portions of a cone (particularly a circular cone) or (circular) truncated cone. The geometrical shape of the seat can correspond to the geometrical shape of the optical body, having regard to geometrical condition that the light through the optical body is preferably vertically incident on the boundary surface of the seat.

Preferably, the end portion of the outgoing optical waveguide is designed accurately to the shape of the receiving space, for instance in the same way as the receiving space, namely pyramidal or cone-shaped. Thus, the end portion can be coupled to the optical body in a fashion accurately fitting in the receiving space, wherein preferably light outcoupling regions of the receiving space and light incoupling regions of the corresponding end portion are designed to be congruent, e.g. plane-parallel.

Altogether, the light-conducting lateral faces of the optical body may deviate from a plane-parallel or concentric or coaxial arrangement, and the direction of incidence of the light on the boundary surface of the recess may deviate from vertical incidence in such a manner that the total light losses of the collector thus caused are ≤15-20% or ≤5-10%, preferably ≤1.5-3%. The light losses are determined by the difference of the luminous flux (lumen) of the total amount of light coupled into the collector through the first coupling points and the luminous flux of the light transmitted from the outgoing optical waveguide.

Preferably, the receiving space is designed cone-like with a second inner lateral surface or has a shape, particularly the shape of a polyhedron, which corresponds to the shape of the outer lateral surface of the optical body.

The receiving space and the recess of the optical body defined by the first inner lateral surface or the lateral surface of a cone can be arranged close to each other, at least with their respective tips, abut each other or penetrate each other, at least by a small amount, the distance of the tips preferably being smaller than 3-5 or 1-2 or 0.5 times the thickness of the outgoing optical waveguide nearby the end portion. Preferably, the tapering receiving space and the preferably cone-like recess of the body defined by the inner lateral surface are arranged on the same (cone) axis and preferably have an equal tip angle, but with the tips of the receiving space and the recess preferably pointing toward each other.

The receiving space can be preferably designed as a straight circular cone or preferably as a straight pyramid, the longitudinal section thereof having a contour in the form of an isosceles, preferably equilateral triangle and the base plane thereof forming the output cross-sectional area for the outcoupled light, wherein the outlet direction a of the light from the collector can be perpendicular to this outlet cross-sectional area. Accordingly, the connecting surface between the receiving space and the optical body, i.e. the light outcoupling surface of the collector, is preferably designed to be pyramidal or cone-shaped or toroidal. The light outcoupling surface can taper into point or be designed as a truncated pyramid or truncated cone. Thus, the end portion of the outgoing optical waveguide preferably has the same circular cone shape as the receiving space. Accordingly, the end portion can be coupled to the optical body in an accurately fitting fashion and with plane-parallel or congruent light output and light input surface sections.

The peripheral boundary surface of the receiving space (e.g. a second inner lateral surface of the optical body or generally the outcoupling surface from the optical body) can be arranged at least in sections or over the full circumference substantially perpendicular to the first outer lateral surface and/or to the first inner lateral surface of the optical body. This can at least apply to the region of the inner and outer lateral surfaces at the tip portion of the optical body. The lateral surface of the receiving space and/or the outer lateral surface and/or the first inner lateral surface of the optical body can be designed as lateral surfaces of a cone, independently of each other or simultaneously. Generally as a result, the incoupling direction of the light into the collector and/or the direction of propagation of the light inside the body at the time of impinging on the peripheral boundary surface of the seat of the end portion of the outgoing optical wave guide can be arranged at least substantially perpendicular to this boundary surface of the receiving space or generally to the outcoupling surface of the optical body.

Preferably, the end portion of the outgoing optical waveguide thus tapers into a cone shape, preferably into a point, and where appropriate, it can also be designed in a mushroom shape or facet-like. Preferably, the end portion of the outgoing optical waveguide tapers towards its free end, but it does not extend laterally beyond the cross section of the outgoing optical waveguide.

Where necessary, although this is clearly less preferred, the first outer lateral surface of the collector can taper into the tip of a cone, said tip frontally engaging in a recess of the end portion of the outgoing optical waveguide. The recess of the end portion can have a depth such that the end portion surrounds the collector at least up to the level of the first inner lateral surface that constitutes the collector body and tapers towards the tip portion. According to a further alternative of the present invention, although this is clearly less preferred, the tip portion may taper off into an appendix extending away from the tip portion and preferably projecting axially, the end face of this appendix being designed for the coupling of the outgoing optical waveguide.

The first coupling points can be positioned relative to the second coupling point in such a manner that the longitudinal center lines of the first coupling points intersect the output cross-sectional area of the second coupling point respectively facing the same. Particularly preferably, the first coupling points or the longitudinal center lines of the light conducting paths connecting the first coupling points to the second coupling point are positioned directly before and relative to the second coupling points in such a manner that the extension of the longitudinal center lines of the first coupling points does not intersect the region of the second coupling point which is opposite with respect to the collector main axis (instead of the above-described longitudinal center lines of the first coupling points also the mean perpendiculars of sections of the second coupling points can be considered respectively, the sections along the collector main axis extending over the entire height of the second coupling point). The longitudinal center lines of the first coupling points directly before the second coupling points can rather intersect just the boundary rim of the second coupling point or they intersect the wall of the outgoing optical waveguide below its end portion arranged in the receiving space of the collector. On the whole, a major part of the incoupled light is thus directly radiated into the second coupling point and from the second coupling point into the end portion of the outgoing optical waveguide, thus preventing that the light is practically radiated through the end portion and exits again through the second coupling region on the opposite side and propagates towards the first coupling portion thus causing light and/or efficiency losses of the collector.

The output cross-sectional area of the collector, which defines the receiving space in the light output direction towards the outside, is preferably at least substantially equal to an average input cross-sectional area of the first coupling points, wherein the deviation from the average input cross-sectional area can be $\le\pm75\text{-}100\%$, $\le\pm33\text{-}50\%$, preferably $\le\pm20\text{-}25\%$ or $\le\pm10\text{-}15\%$, particularly preferably $\le\pm5\%$. The average input cross-sectional area results from the total of all input cross-sectional areas divided by the number of first coupling points. If the input cross-sectional areas of the first coupling points are respectively equal among each other and equal to the output cross-sectional area, this results in that geometrically the cone-shaped receiving space has a cross-sectional profile in the form of an equilateral triangle. In this case, the longitudinal center lines of the first coupling points can intersect the boundary rim of the second coupling point or the rim of the output cross-sectional area. This arrangement is optimal with regard to the efficiency of the collector and also with regard to the diameter of the outgoing optical waveguide which can have relatively small dimensions (namely as large as the incoming optical waveguide) and thus a relatively low weight. Where necessary, the output cross-sectional area of the collector can also be larger or smaller than the average input cross-sectional area of the first coupling points. In the first-mentioned case, the longitudinal center lines of the light-conducting paths are positioned relatively steeply with respect to the longitudinal axis of the outgoing optical waveguide, which in this case has a relatively large cross section and thus a high weight and high material requirements. In the latter case, the longitudinal center lines of the light-conducting paths are positioned relatively flatly with respect to the longitudinal axis of the outgoing optical waveguide, and an increasing part of the light is radiated through the end portion of the outgoing optical waveguide and is propagated back again towards the first coupling points, which results in efficiency losses of the collector. Accordingly, the output cross-sectional area and the outcoupling surface of the collector to the outgoing optical waveguide can generally be different from each other and the optical outcoupling surface can generally be larger than the geometrical output cross-sectional area. Generally, the optical outcoupling surface can be smaller than the total of all input cross-sectional areas, for instance smaller than 3 to 4 or smaller than 2 times the average input cross section of the same.

The output cross-sectional area of the collector, which defines the receiving space towards the outside in the light output direction, can be $\le\frac{1}{3}\text{-}\frac{1}{4}$, $\le\frac{1}{6}\text{-}\frac{1}{8}$ or $\le\frac{1}{10}\text{-}\frac{1}{15}$ or $\le\frac{1}{20}$ of the total input cross-sectional area of the first coupling points through which light is coupled into the collector.

Preferably, the two light-conducting lateral faces (i.e. the inner and the outer light-conducting lateral faces defining the light-conducting region of the collector between them) each taper in the base portion towards the tip portion or converge towards the tip portion. Accordingly, the two light-conducting lateral faces, between which the light-conducting region of the optical body is defined, each taper also between the base portion and the tip portion towards the tip portion or converge between the base portion and the tip portion towards the tip portion. The light-conducting region of the collector is thus constricted inwardly and outwardly by the light-conducting lateral faces, depending on the geometry of the collector body, e.g. in the radial direction (cone-shaped collector) or in the lateral direction (plate-like, flat collector).

Preferably, the first and the second light-conducting lateral faces each expand at an angle of 90-150° or 105-135° or preferably 110-130° or approximately 120° from the tip portion towards the base portion, which can apply to both light-conducting lateral faces independently of each other or to the first and the second light-conducting lateral faces, with the angle being the same in the first and the second light-conducting lateral faces. The wall thickness of the light-conducting region between the inner and the outer light-conducting lateral faces is preferably constant in this case, i.e. the inner and the outer light-conducting lateral faces are parallel, or it in increases. Where necessary (although less preferred), the wall thickness can slightly taper towards the tip portion. Here the tapering of the wall thickness is preferably smaller or considerably smaller than the tapering of the external side of the collector altogether, for instance ≤30-50% or ≤10-20% or ≤5% or 0-2°, which means that when the corpus converges on the outside under an angle of 90°, the wall of the light-conducting region preferably converges by less than 45° (50%) or less than 30° (30%) in relation to the angle between the inner and outer light-conducting lateral faces.

The outer and/or first inner lateral surface, in particular the respective lateral surface of a cone, can include at the tip portion an angle (cone angle) of approximately 120°, for example 140-100° or 135-105°, preferably 130-110° or 125-115°. If the first inner (cone) lateral surface and the second inner (cone) lateral surface are arranged perpendicular to each other, the resulting tip angle of the second inner (cone) lateral surface determining the seat of the end portion of the outgoing optical waveguide amounts to approximately 60°, for example 40-80° or 45-75°, preferably 50-70° or 55-65°.

The collector can comprise 2-3 or more, e.g. 4-6 or more or more than 8-10 first coupling points for the incoming optical waveguides that feed an outgoing optical waveguide. The number of the first coupling points is normally not limited, except for practical reasons.

The base portion of the optical body can be peripherally chamfered so as to conically taper in the region of the first coupling points towards the base end. The first coupling points can at least be substantially perpendicular to the chamfered region and can be molded to it. Thus the ends of the incoming optical waveguide can be directly coupled to the base portion of the optical body, where necessary. The chamfering can generally correspond to the narrow face of the wall of the optical body that is defined by the outer and inner (cone) lateral surfaces. But the wall can also taper towards the base, thus preventing undesired outcoupling of light.

The preferably circular input cross-sectional areas of the first coupling points can each be approximately the same size. Correspondingly, the preferably circular cross sections of the end portions of some or all of the incoming optical waveguides among each other can at least approximately be the same size. The diameters of the first coupling points and those of the associated optical waveguide ends can at least approximately be the same size.

The first coupling points can each be designed as appendices of the optical body which can extend radially outwards and/or axially away from the body. Preferably, the appendices are arranged within the outer shell area (or the extension thereof) defining the body, for instance between or centrally between an inner and outer (cone) lateral surface of the same. The appendices can by cylindrical or in the form of a circular cylinder, the cylinder axis defining the longitudinal center line of the first coupling points. The input cross-sectional area of the appendices, to which area the optical waveguides can be coupled, can be arranged perpendicular to the light incoupling direction. Alternatively, the first coupling points can each include a seat with a preferably circular cylindrical receiving space that can be worked in the optical body or in appendices of the same in the incoupling direction. In each of these seats an end portion of an incoming optical waveguide can be fixed in an accurately fitting manner.

Except of some coupling points which are designed as appendices, the optical body can be rotation-symmetric.

Preferably, the first coupling points are mutually equally spaced in the base portion. If the base portion has a polygonal base plane or preferably a round base plane, the first coupling points are preferably equally spaced and peripherally arranged in this base portion.

Preferably, the optical body is formed integrally with at least the first coupling points, thus simplifying its manufacture. But where necessary, the optical body can also be composed of multiple segments, for example of half-shells or multiple circumferential segments which respectively extend only about a part of the circumference of the body and/or of part-segments which are combined in an axial direction. In this case, additional coupling points can be provided between the above-mentioned first coupling points intended for incoupling light and the second coupling point intended for outcoupling light.

The optical body can be made of a material for optical waveguides, preferably of polymethylatemethacrylate (PMMA) or an inorganic glass.

The optical body and/or the incoming optical waveguide and/or the outgoing optical waveguide preferably each consist of a light-conducting material having a higher optical refraction index than the material respectively surrounding them. The surrounding material mostly is air, but it can also be a different material having a lower refraction index, for example water or a different liquid or also a solid matrix. The difference of the refraction indices between the material of the optical body and/or the incoming optical waveguide and/or the outgoing optical waveguide on the one hand and the material surrounding the same on the other hand can be ≥0.025, preferably ≥0.05-0.075 or ≥0.1-0.15, particularly ≥0.20-0.25. Where required, the difference can also be ≥0.3 or ≥0.35-0.4.

Normally, the difference is sufficiently big for keeping the outcoupling of light and thus efficiency losses small. Where required, also the refraction index of the light-conducting material of the optical collector and/or of the incoming optical waveguide and/or the outgoing optical waveguide can be smaller than the refraction index of the materials surrounding the same, wherein even in this case the amount of the difference of the refraction indices can assume the above-mentioned values. Preferably, (i) the incoming optical waveguides and the optical body and/or (ii) the optical body and the outgoing optical waveguide or (iii) the components of the incoming optical waveguide, the optical body and the outgoing optical waveguide consist of the same material or of materials at least having similar refraction indices, i.e. the absolute difference of the refraction indices of the materials of these three components (outgoing and incoming waveguides and optical body) preferably is ≤1-0.75 or ≤0.5-0.3 or preferably ≤0.25-0.2 or ≤0.1-0.15. Preferably, the conduction of light through the stated three components takes place continuously through light-conducting material via a light-conducting path in which the difference in the refraction indices of the materials is ≤1-0.75 or ≤0.5-0.3 or preferably ≤0.25-0.2 or ≤0.1-0.15. The difference of the refraction indices of the three components compared to their surrounding material can be ≤30-50% or ≤10-20% of the difference of the refraction indices between the three stated components, namely the optical body, the incoming and the outgoing optical waveguides. The optical body, the incoming and the outgoing optical waveguides can each consist either independently or in combination of materials whose refraction index is in the range of 1.2 to 3.9, preferably in the range of 1.3 to 3.1 or in the range of 1.35 to 2.4.

The optical body can generally be designed in such a manner that the incoupled light can freely propagate in the optical body, i.e. through total reflection on the boundary surfaces of the body. Where required, the light-conducting paths of at least some or all of the coupling points in which the incoupled light propagates towards the outcoupling point can also be defined in the lateral direction by optical means, so that also the light-conducting paths have a smaller width than the optical body or its circumferential direction. These optical boundaries can be produced by material having suitable optical properties, e.g. the refraction index, which material is incorporated in portions of the optical body. These materials can be mechanically incorporated in the body, e.g. in recesses of the same that can be filled with a different material, but also by a suitable doping or internal texturing of the material of the body, e.g. by (laser) holographic process. But preferably, the light can also freely propagate in the circumferential direction of the optical body, at least on the base portion by an extension which is ≥than 2-4 or ≥than 6-8 times the extension of the first coupling point of the respective optical waveguide in this direction. In the circumferential direction of the body, a continuous light-conducting path around the full circumference can exist, thus avoiding optical losses. Due to the conical shape of the optical body, the light is focused and outcoupled in the second coupling point independently of its propagation in the circumferential direction of the body.

The present invention further provides an optical device including at least one collector of the invention. Here, the focusing of the light and increasing of the energy density of incident light by means of the collector can contribute to an increase of the efficiency of the device. The device can also comprise a plurality of collectors coupled to each other in a cascade-like fashion to increase the energy density of the light in the direction of propagation of the light.

The device can generally have a first installation which is arranged upstream of the collector and comprises the incoming optical waveguides and is intended for generating and/or receiving light and for feeding the light into the incoming optical waveguides. Further, a second installation can be provided downstream of the collector and comprises the outgoing optical waveguide and is intended for transmitting light, processing light, energy conversion with the light as a primary energy source, processing materials by means of light and/or illumination.

The first installation can comprise for example an apparatus (primary apparatus) collecting light, e.g. sunlight, said apparatus respectively radiating light into the incoming optical waveguides and bundling or focusing this light to a certain extent, e.g. light reflectors like offset mirrors or parabolic mirrors and/or lenses or the like. The primary collector can have a focal length of ≤20-25 mm, ≤10-15 mm or ≤6-8 mm, preferably ≤3-4 mm, so that the same can be manufactured with very high optical precision to allow incoupling into the optical waveguides as loss-free as possible. The first device can comprise a light-generating apparatus including illuminants like LEDs or a laser whose efficiency and application spectrum can be increased by means of the collector.

The second device can for instance be an energy conversion system, illumination system and/or a system for the transmission of optical signals. By means of the second device the collected light can be converted for instance into heat, electric current and/or voltage or into light having a different illuminating power.

For energy conversion, the optical device can be connected for instance to a photovoltaic system or to a solar collector system utilizing thermal energy, the collector being capable of focusing or concentrating sunlight and transmitting the concentrated light via the outgoing optical wave conductor to the photovoltaic or solar collectors for energy conversion. Photovoltaic or solar collectors can thus be arranged at a greater distance from the collector or feeding location of light into the incoming optical waveguide and the light can be transmitted to the collector and energy converter practically loss-free and in a fashion independent of external influences like weather. By focused light having a higher energy density being applied to the energy converters, their efficiency can be considerably increased. Furthermore, the photovoltaic collectors can be arranged in a cool atmosphere, thus increasing their efficiency. The solar collectors of a residential house for instance can be accommodated in a separate room, e.g. a cellar room, so that the heat exchanger medium that has been heated by solar energy needs not be transferred as usual from the roof to the basement for heat storage, which inevitably causes heat losses, but is heated by the sunlight which is transmitted through optical waveguides practically loss-free not until the heat storage in the cellar. If necessary, the light from the outgoing optical waveguide can be fanned by a diffusion means such as a diffusion disk before its incidence onto the energy converter, should the energy density be excessively high.

Further, the optical device can also be an illumination device by means of which external light is focused through the collector and transmitted by one or more optical waveguides to any desired location of a building for being used there for interior and/or exterior lighting. This light can be used for a more focused or diffuse illumination, while for illuminating larger areas of an interior the light can be transmitted to a diffusion device, e.g. a diffusion disk.

Generally, the optical device can transmit the light focused through at least one collector also to several second devices or consumers. To this end, optical shunts or branchings can be provided in the light-conducting path. In principle, these branchings can be designed corresponding to the collector of the invention, the outgoing optical waveguide now serving to feed light into the collector body and the light being outcoupled into further optical waveguides through the first coupling points.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The word "front" designates a direction in the drawings to which reference is made. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, FIGS. 1-4 show various views of an optical collector 1 that preferably comprising an optical input or input region 2 for incoupling light from several incoming optical waveguides LE into the collector 1 and an optical output 3 for outcoupling light from the collector 1 into an outgoing optical waveguide LA. In the illustrated embodiment, the optical collector 1 comprises a cone-shaped optical body 4 having a base portion 5 and a tip portion 6. In the base portion 5 the optical input 2 including a plurality (eight in the present case) of first coupling points 7 is arranged, which are circumferentially equally spaced from each other and into which light can be coupled respectively in an incoupling direction e. The tip portion 6 includes the optical output 3 comprising a second coupling point 8, so that the light is incident on the exit window or outcoupling surface of the optical body, which is here defined by the below-mentioned second inner lateral surface of a cone, at least substantially perpendicular to direction e' and is outcoupled in this direction. The light which is incoupled at the first coupling points is then further transferred from the collector and through the outgoing optical waveguide LA in the output direction a.

The first coupling points 7 preferably each comprise an optical input cross-sectional area 9, and the second coupling point 8 comprises an output cross-sectional area 10. As shown in the drawings, the output cross-sectional area 10 is smaller than the total of all input cross-sectional areas 9 and, in the embodiment, is as large as one single input cross-sectional area. The cone-shaped optical body 4 thus functions as an optical funnel, by the light being coupled into the optical body 4 through a large input cross-sectional area 9, i.e. the total of all input cross-sectional areas 9, transferred inside the optical body 4 from the base portion 5 to the tip portion 6 under a constant increase of a light or energy density, and finally outcoupled with an increased light density in the optical output 3. Accordingly, the optical body can generally taper towards its tip portion, wherein the wall thickness of the light-conducting region of the body can at least substantially be equal or also increase towards the tip portion.

The optical body 4 includes two light-conducting lateral faces 11 between which the incoupled light is conducted towards the tip portion 6 under total reflection on these lateral faces. In the illustrated embodiment of the collector 1 including the cone-shaped body 4, one light-conducting lateral surface is formed by an outer lateral surface 12 of a cone, the incoupling direction e of the individual first coupling points respectively being parallel to the outer lateral surface 12. The optical body 4 is designed as a hollow cone (see FIG. 3). An additional light-conducting surface is formed by an inner lateral surface 13 of a cone, the two lateral surfaces 12, 13 being arranged parallel to each other and coaxially to each other with respect to a cone axis k or to the collector main axis. Both lateral surfaces 12, 13 include an equal first apex angle α. Both lateral surfaces 12, 13 define a wall 14. The wall thickness in the base portion 5 and preferably also over the entire height of the collector (i.e. in the propagation direction of the light) can at least substantially be equal to the diameter d1 of the input cross-sectional area of the first coupling points. The optical input cross-sectional area 9 of the first coupling points 7 can thus extend over the entire width of wall 14. The inner lateral surface 13 defines on its part a recess 15 that extends in a tapering fashion from the base portion 5 towards the tip portion 6 and thus represents a hollow cone that can be filled if necessary with a material which is non-conducting or which can practically not be penetrated by the light conducted between the light-conducting lateral faces. As a result, the light is conducted linearly and loss-free from the base portion 5 towards the tip portion 6, which may generally apply. But generally, the wall of the optical collector may also be non-linear, e.g. curved or angled in its cross section or in the propagation direction of the light.

Accordingly, the collector may have a smaller aperture angle in its base portion than in its tip portion for example, to thus define the outer diameter of the collector. But the wall thickness of the collector over its height can nevertheless remain constant, at least substantially. Where required (though this is less preferred), the two light-conducting lateral faces in general or the two lateral faces 12, 13 in particular can include an angle with respect to each other and, in the illustrated embodiment, have (preferably only slightly) different angles with respect to the cone axis k or to the collector main axis and/or to the incoupling direction of the light into the collector, although this is not preferred to a parallel arrangement of the two light-conducting lateral faces. For example, compared to the position illustrated in the Figure, the inner and/or outer light-conducting lateral faces (or the lateral faces 12, 13) can be independently inclined by ±20-30° or preferably by only ±5-10° with respect to the cone axis k or with respect to the incoupling direction, thus allowing the cross section of the wall of the light-conduction region of the optical collector to slightly taper or (which is even more preferred) to increase towards the tip portion, the light-conducting wall being defined by a light-conducting surface (in the present case cone-shaped) tapering towards the tip portion also towards the interior of the collector.

Accordingly, the two light-conducting lateral faces 11 in the base portion, between which the light-conducting region of the optical body is defined, each taper in a direction towards the tip portion or respectively converge in the direction towards the tip portion. The first and the second light-conducting lateral faces each expand under an angle of 90-150° from the tip portion towards the base portion, which may independently apply to the first and the second light-conducting lateral faces, or under angle which is the same for the first and the second light-conducting lateral surfaces.

The first coupling points 7 each have a preferably circular cylinder-shaped appendix 16 with a cylinder axis z forming a longitudinal center line 1 of the first coupling points. The longitudinal center line 1 is parallel to the incoupling direction e and parallel to the light-conducting lateral face 11. The longitudinal center line 1 may vertically intersect the input cross-sectional area 9, which in the present case is constituted by a face 17 of the respectively associated appendix 16 and simultaneously serves as a coupling surface to the incoming optical waveguide LE. Accordingly, the appendices 16 extend away from the tip portion 6 in a manner flush with the radially outer or with both light-conducting lateral faces 11.

Figure 1:
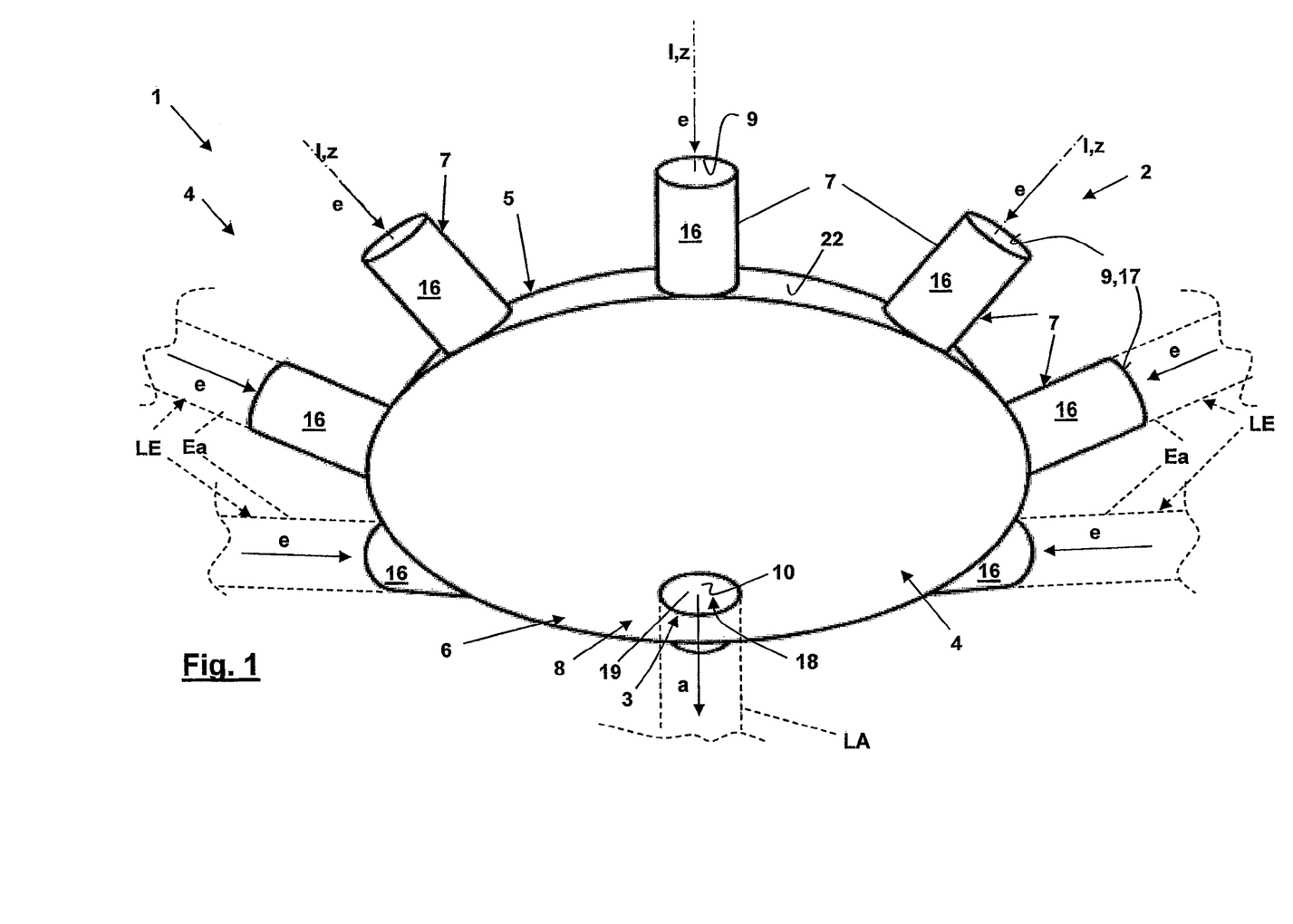
FIG. 1 is a perspective view of an optical collector in accordance with a preferred embodiment of the present invention.
Figure 2:
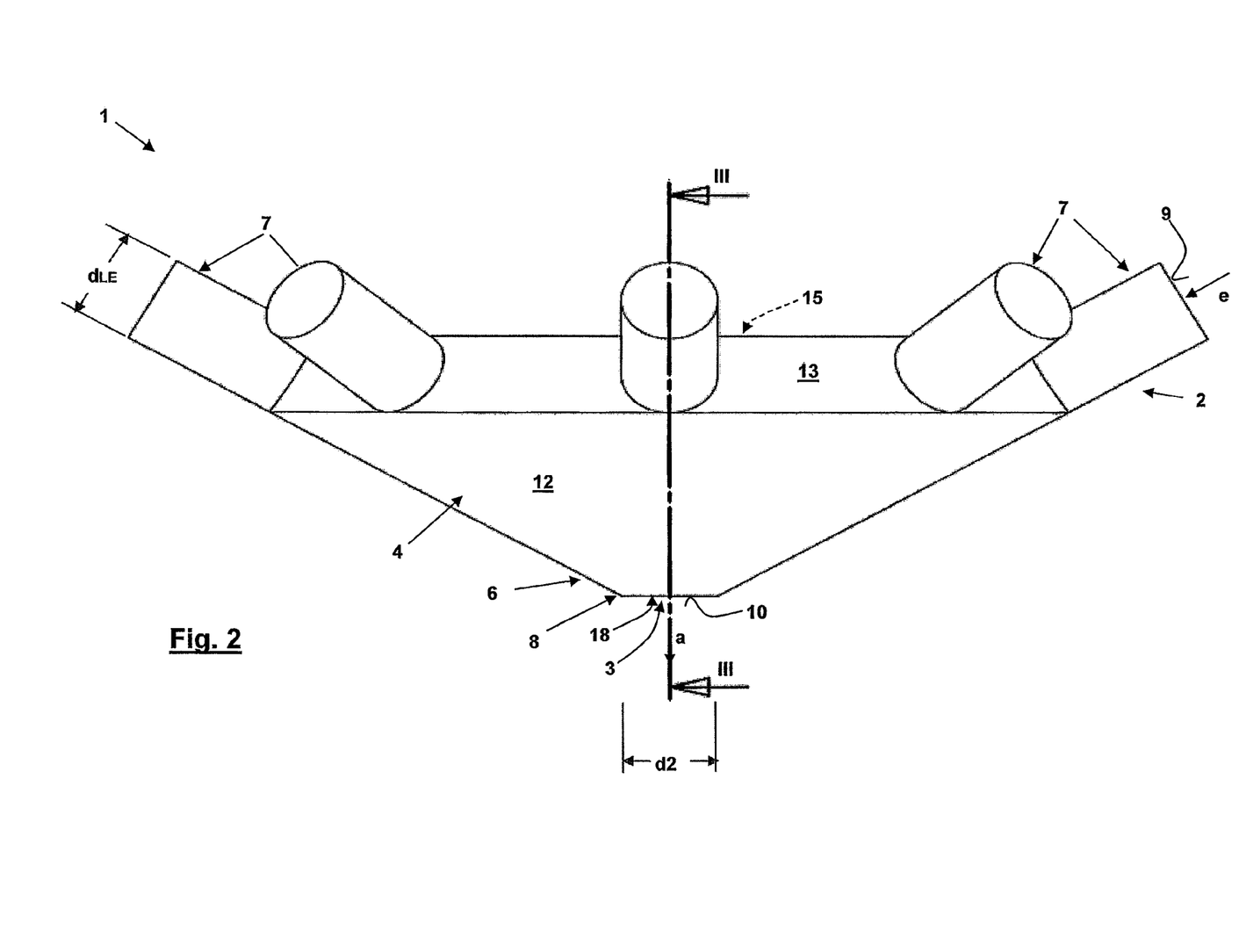
FIG. 2 is a lateral view of the collector shown in FIG. 1.
Figure 3:
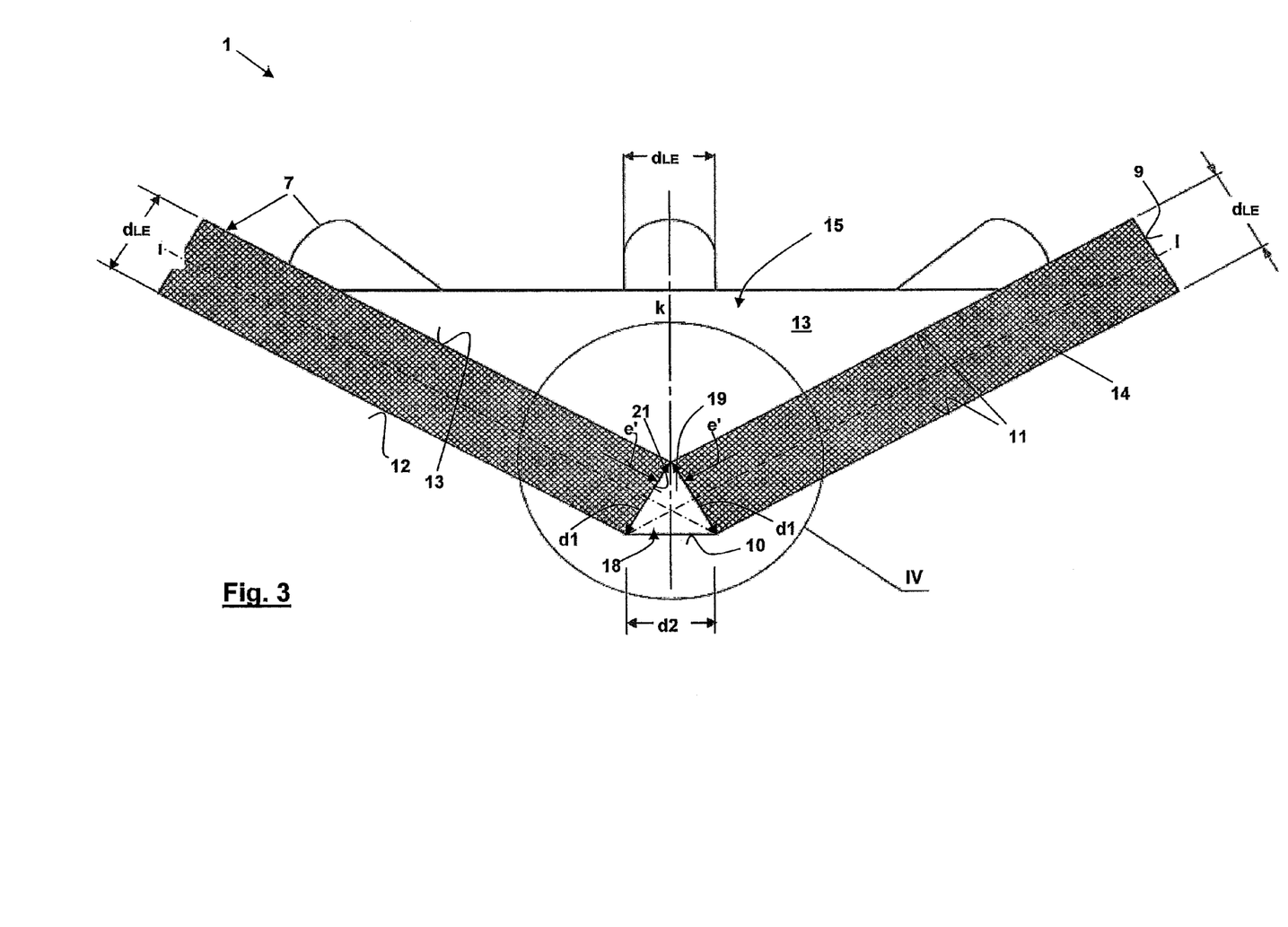
FIG. 3 is a cross-sectional view of the optical collector shown in FIG. 2, taken along cutting line III-III.
Figure 4A:
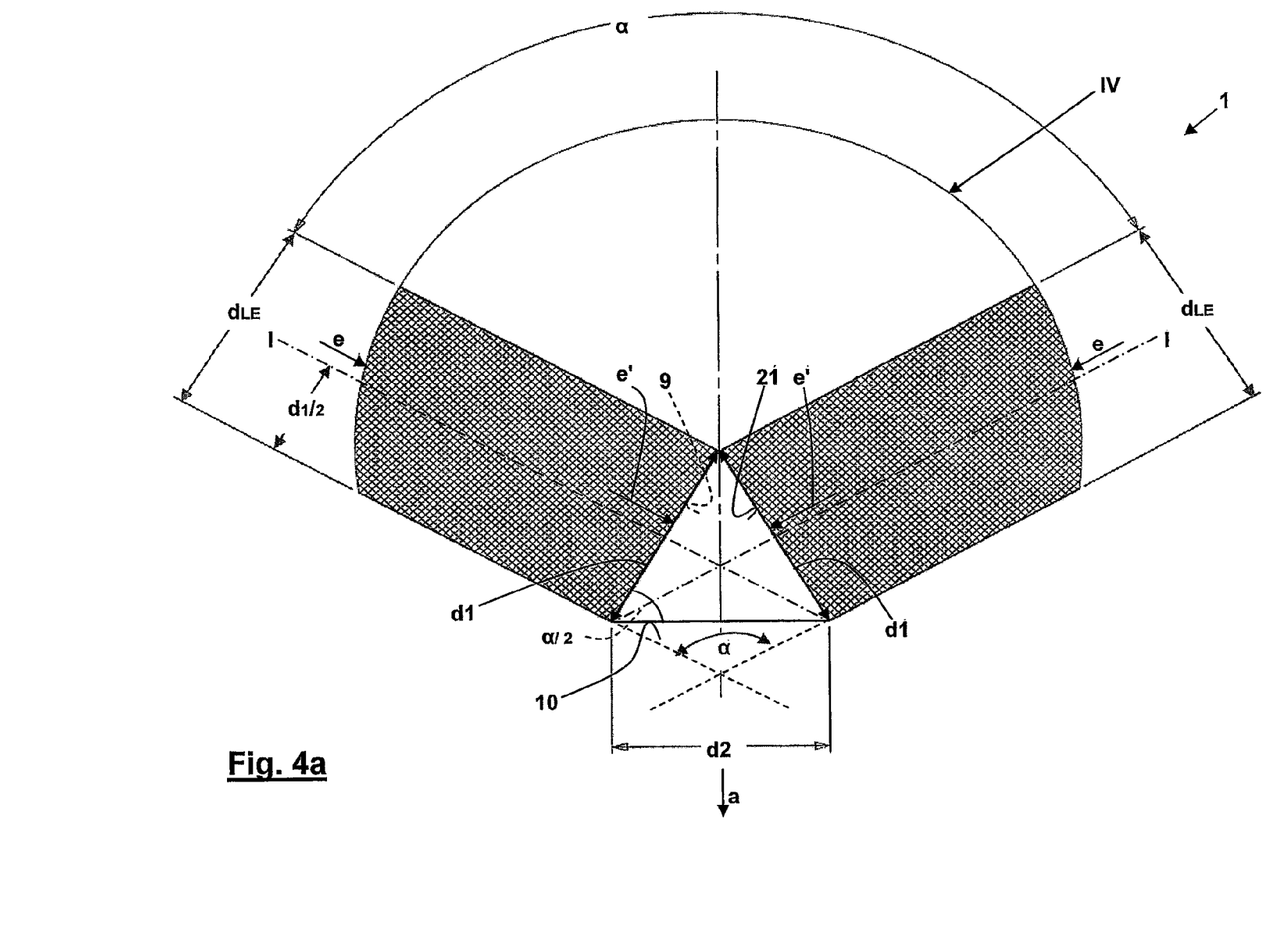
FIG. 4a is a selective enlargement of the optical collector according to section IV of FIG. 3.
Figure 4B:
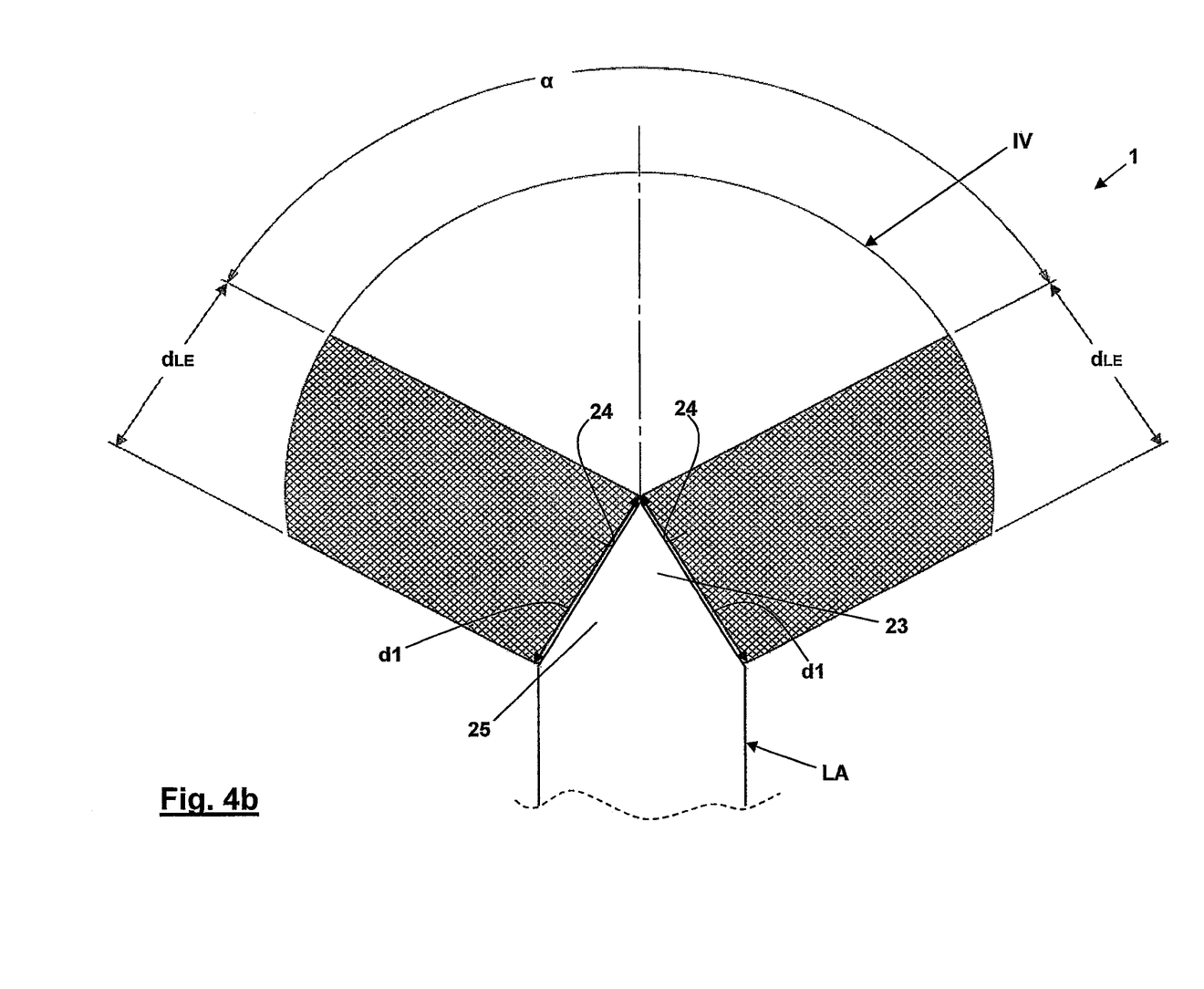
FIG. 4b is an illustration similar to FIG. 4a, with an outgoing optical waveguide.

The second coupling point 8 includes a seat 18 for an end portion Ea of the outgoing optical waveguide LA. The seat 18 includes a receiving space or hollow space 19 comprising the base plane 20 that can be designed in a circular fashion and constitutes the output cross sectional plane 10. The light leaves the region of the collector through the output cross-sectional plane. The receiving space 19 tapers from the base plane 20 towards the base portion of the collector and it is preferably cone-shaped with a second inner lateral surface 21, preferably the lateral surface of a circular cone. Here, the second inner lateral surface 21 thus constitutes the light outcoupling surface from the collector or from the optical body. Preferably, the light outcoupling surface additionally reduces or minimizes incoupling of back-scattered light from the end portion of the outgoing optical wave conductor. This outcoupling surface is preferably arranged in such a manner that the light conducted in the optical body is preferably vertically incident on this surface and can penetrate this surface practically loss-free from the input side. Through this inner boundary surface of the seat the light is outcoupled from the collector and can penetrate into the end portion of the outgoing optical waveguide that preferably contacts the inner boundary surface of the seat over its full area and without gaps. Due to the connection of the two components, namely the collector 1 on the one hand and the end portion of the outgoing optical waveguide on the other hand, more precisely the part 23 of the end portion received by the receiving space 19, a total reflection of light can take place on the connecting surface 24, the light from the interior 25 of the end portion being incident on the connecting surface 24 under a suitable angle and thus reflected back to the end portion and further to the outgoing optical waveguide LA. Losses of light that has already been coupled into the end portion are thus clearly reduced, which clearly increases the efficiency of the collector (FIG. 4b).

The lateral surface of the recess 18, which preferably represents a lateral surface of a circular cone, has a length d1. This length d1 can at least substantially be equal to the diameter dLE of the input cross sections 9 of the individual first coupling points. The lateral surface length d1 and the output cross-sectional plane 10 having the diameter d2 of the second coupling points can be the same size and form an equilateral triangle in the cross sections of the collector 1 illustrated in the FIGS. 3 and 4. The longitudinal center lines 1 of the two first coupling points illustrated here in a sectional view or the longitudinal center lines of the light-conducting paths directly in front of the seat (corresponding to the perpendicular to the lateral surface of the seat) each can intersect just the rim of the output cross sectional plane 10. The longitudinal center line 1 or the longitudinal center lines of the light-conducting paths thus preferably form the extensions of the bisector of the cross sections of the receiving space with respect to the corner of the receiving space which lies opposite in the light conducting direction. The apex angles here referred to as first apex angle α of the first outer lateral surface 12 and the first inner lateral surface 13 each amount to 120°. This angle, which results from the equal diameters d1, d2 of the lateral surface length and the output cross sectional plane 9, 10 (see FIG. 4a) is optimal, because a major part of the incoupled light is thus directly outcoupled into the outgoing optical waveguide LA, while a possible share in the light back-scattered in the optical body can be kept small. In addition, the output cross-section of the collector and hence the diameter of the outgoing optical waveguide can be kept relatively small, which results in a considerable increase of the light density in the outgoing optical waveguide. Moreover, the base portion of the collector is sufficiently large for allowing coupling of a plurality of incoming optical waveguides. But where necessary, the diameter d2 of the outgoing optical waveguide can be 1.5 to 2 or up to 3 to 5 times the diameter dLE of the input cross sections 9 of the individual coupling points, without being limited thereto, which may generally apply.

The end portion Ea of the outgoing optical waveguide LA is pointed and fitted in the receiving space 19 accurately to the shape of the receiving space, so that the end portion contacts the boundary surface of the seat over its full area and free of gaps. An adhesive may be used if necessary, although this is not preferred. The end portion Ea has the same circular cone-shape as the receiving space 19 and can thus be snuggly fitted in the seat 18, with its lateral surface plane-parallel to the second inner lateral surface 21.

The base portion 5 is conically beveled on its periphery, so that it includes an outer lateral surface which is referred to as second lateral surface 22 that is arranged at right angles to the first lateral surface 12.

The first outer lateral surface and/or the first inner lateral surface of the optical body can thus be at least substantially perpendicular to the boundary surface of the seat, which boundary surface can constitute a (second) inner lateral surface of the body. Ideally, the wall thickness of the optical body between the first outer and the first inner lateral surfaces is equal to the diameter of the input cross-sectional area of the light incoupling points.

The optical body comprising the first coupling points 7 and the second coupling point 8 is formed as one piece from an optical waveguide material, in this case polymethylate-methacrylate (PMMA). The same material can normally be used for the incoming and/or outgoing optical waveguides. The optical body and/or the incoming optical waveguide and/or the outgoing optical waveguide can each consist of the same light-conducting material, for example PMMA.

Figure 5:
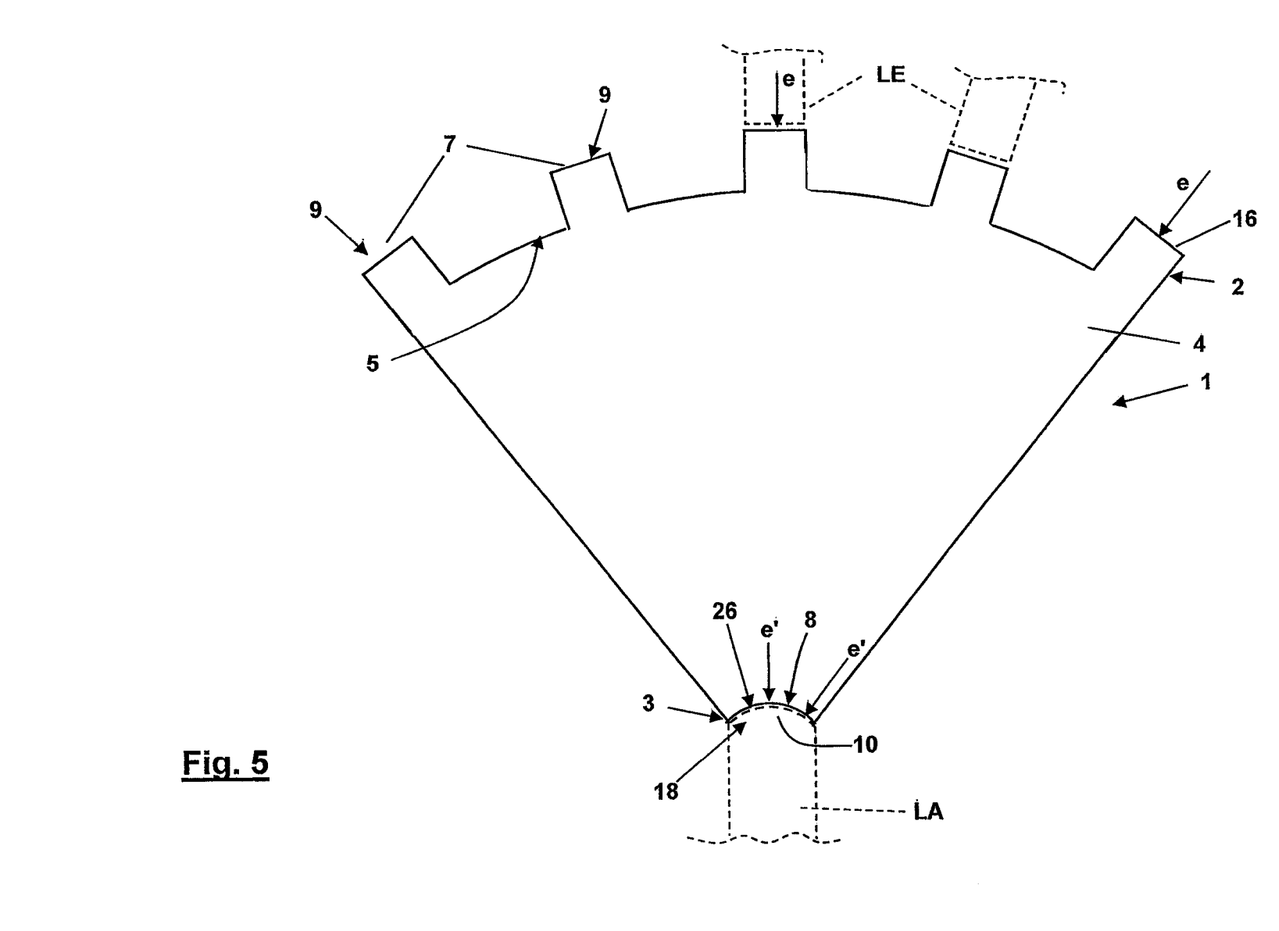
FIG. 5 is a schematic representation of a lateral view of an optical collector according to an alternative preferred embodiment of the present invention.

FIG. 5 shows an alternative embodiment of an optical collector 1 of the present invention, which in includes a flat, disk-like corpus which may have a constant thickness, at least substantially. Here, the corpus mainly has the form of a segment of a circle. An optical input 2 for coupling light from multiple incoming optical waveguides LE, which can substantially lie in one plane here, into the collector, and an optical output 3 for outcoupling light from the collector into an outgoing optical waveguide LA are provided. The collector also comprises an optical body 4 with a base portion 5 in which the optical input 2 comprising at least two coupling points 7 is arranged, and a tip portion 6 in which the optical output comprising a second coupling point 8 is arranged. Between the first coupling points pocket-like recesses can be provided in the corpus which open towards the base portion and which can extend over the thickness of the corpus, thus defining the light-conducting region of the corpus. The regions of the corpus thus developed can substantially continue the appendices 16. Here, too, the first coupling points each comprise an optical input cross-sectional area 9, and the second coupling point comprises an output cross-sectional area 10, the output cross-sectional area being smaller than the total of all input cross-sectional areas. The opposite flat sides of the optical body constitute light-conducting lateral faces of the optical body which extend from the base portion towards the tip portion with a distance to each other that can substantially remain constant or increase towards the tip portion. The first coupling points are arranged in such a manner that they incouple light between the light-conducting lateral faces. It will be understood that these lateral faces may also be curved, e.g. outwardly curved, or textured. The outcoupling surface 26 or the exit window of the collector can also be curved in arc shape or designed polygonally, corresponding to the number of incoming optical waveguides. This outcoupling surface 26 of the collector or optical body corresponds to the second inner lateral surface 21 of the collector according to the FIGS. 1-4 and may represent also in this case a metallized (e.g. semi-transparently metallized) outcoupling surface. Here, too, the outcoupling surface may define the connecting surface to the end portion of the outgoing optical waveguide LA and thus also a seat 18 for the said end portion. In this case, the light leaves the collector in the output direction a.

The corpus includes attachment pieces 16 for coupling the incoming optical waveguides LE. The light which is incoupled through the incoming optical waveguides can be incident on the input cross sections 9 in a perpendicular direction e. Independently thereof, the light can also impinge onto the outcoupling surface 26 of the collector in a perpendicular direction e', preferably under a linear propagation of the light in the optical body. Also the incidence direction e of the light can be substantially perpendicular to the outcoupling surface 26.

Figure 6A:
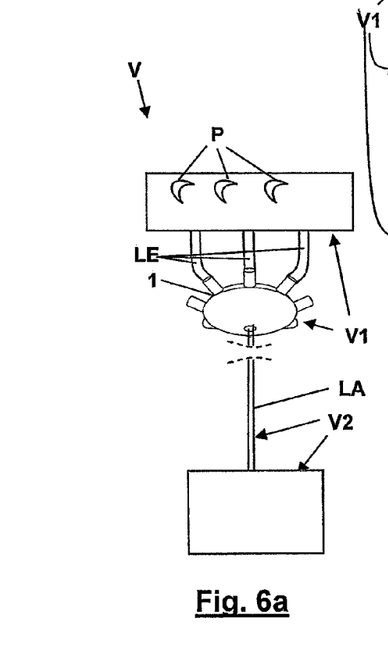
FIGS. 6a and 6b are general views of a preferred embodiment of a device respectively including an optical collector and multiple optical collectors.
Figure 6B:
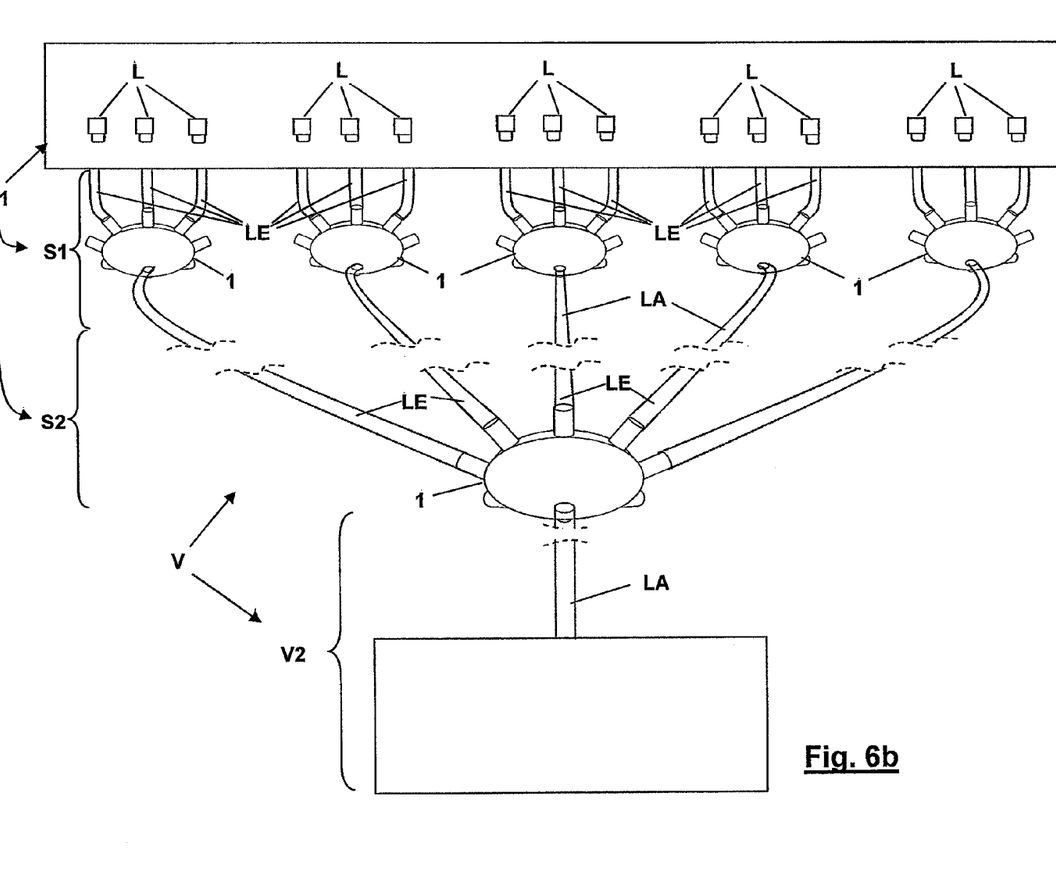

FIGS. 6a and 6b illustrate examples of a possible use of the collector 1 in a device V. Referring to FIG. 6a, the device E can comprise a first installation V1 upstream of the collector 1 and including the incoming optical waveguides LE and intended for receiving light, and a second installation V2 downstream of the collector 1 and including the outgoing optical waveguide LA and intended for energy conversion. Between the two installations V1, V2 the collector 1 is arranged and connected to the optical waveguides LE, LA. For the sake of clarity, only some of the incoming optical waveguides LE between the first installation V1 and the collector 1 are shown. An outgoing optical waveguide LA leads from the collector 1 to the second installation V2 that is arranged remote from the first installation V1 and the collector 1. The installation V may be a solar system, e.g. a solar thermal system. The first installation V1 may include small parabolic mirrors P or other means such as auxiliary collecting lenses for coupling light into the incoming optical waveguides LE. The light from the collector 1 is transmitted without loss in the outgoing optical waveguide LA to the remote second installation V2. The second installation V2 can serve for energy conversion or as an illumination device, without being limited thereto, and in the present case for the conversion of light energy into thermal energy using customary solar collectors (not shown) and heat exchangers or alternatively photovoltaic collectors.

FIG. 6b shows a second preferred embodiment of the installation V in which a plurality of optical collectors 1 are provided and connected in series in a cascade-like fashion one behind the other in several steps, which may be the case independently of this preferred embodiment. In a first step 1, a plurality of optical connectors 1 are arranged parallel to each other. These collectors 1 of the first step S1 are each connected to a plurality of incoming optical waveguides LE, only a few of them being illustrated. Arranged in series with the collectors 1 of the first step 1 is a collector 1 of a second step S2, and also the second step can comprise multiple collectors, if necessary, and several (additional) cascade steps can be provided. In the first installation V1, light from light-emitting diodes (LEDs) for example is coupled into the incoming optical waveguides LE using suitable means. Light which is coupled by the collectors 1 of the first step into the outgoing optical waveguides LA coupled to these collectors, is coupled into one or more collectors 1 of the second step S2, further focused in this collector and finally transmitted to the remote second installation V2 via the associated outgoing optical waveguide LA of this collector, wherein in this case the second installation V2 may be designed for example as illumination device or also as energy converter such as a solar or photovoltaic system. This generally allows light from relatively weak light sources being focused to the desired extent.

Accordingly, the illumination device of the present invention allows the light collected by the collectors 1 being transmitted to an object to be illuminated, e.g. to the interior of a building. The installation V2 can radiate the light via a diffusion device, e.g. a diffusor, to avoid undesired high light intensities inside a building or on the respective object.

The installations V2 can also have branchings, or branchings are arranged upstream of the installations to enable the light focused by the collector and conducted through one or a few outgoing optical waveguides being outcoupled at desired locations and supplied to several consumers such as the installations V2. Corresponding to the collector, the branchings can be designed with reversed light propagation direction.

The light coupled into the incoming optical waveguides is preferably sunlight, where necessary also light from other light sources.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An optical collector including an optical input for incoupling light from multiple incoming optical waveguides into the collector and an optical output for outcoupling light from the collector into an outgoing optical waveguide, wherein the collector comprises an optical body with a base portion, in which the optical input including at least two first coupling points is arranged, and a tip portion, in which the optical output including a second coupling point is arranged, the first coupling points each have an optical input cross-sectional area and the second coupling point has an output cross-sectional area, and the output cross-sectional area is smaller than the total of all input cross-sectional areas,
    wherein the second coupling point includes a seat for an end portion of the outgoing optical waveguide, the seat including a receiving space having a base plane forming the output cross-sectional area, the receiving space tapering from the base plane in a direction toward the base portion of the collector, and
    wherein the optical body is cone-shaped and is defined by two light-conducting lateral faces designed as an outer lateral surface and an inner lateral surface of a cone, between which light is incoupled through the first coupling points and which radially inwards and radially outwards define a light-conducting region of the optical body, the inner lateral surface forming either a hollow cone tapering toward the tip portion or a cone made of a material not substantially penetrated by light.

2. A collector according to claim 1, wherein the two light-conducting lateral faces extend from the base portion towards the tip portion with a distance to each other which is approximately constant or increases towards the tip portion.

3. A collector according to claim 2, wherein the two light-conducting lateral faces respectively taper or converge in the base portion towards the tip portion.

4. A collector according to claim 2, wherein the two light-conducting lateral faces each expand under an angle of 90-150° from the tip portion towards the base portion.

5. A collector according to claim 2, wherein the light-conducting lateral faces define a wall having a wall thickness and that the optical input cross section of the first coupling points at least extends over almost the entire wall thickness.

6. A collector according to claim 1, wherein the first coupling points each have a light incoupling direction running at least approximately parallel to the outer lateral surface.

7. A collector according to claim 1, wherein the second coupling point is designed in such a manner or provided with such means that compared to an optically continuous light-conducting path made of the light-conducting material of the optical body of the collector, this coupling point or these means reduce or minimize entry of back-scattered light from an outgoing optical waveguide coupling to the second coupling point back into the optical collector.

8. A collector according to claim 1, wherein the end portion of the outgoing optical waveguide is fitted in the seat in such a manner that light leaving from the second coupling point is coupled into the outgoing optical waveguide predominantly through the end portion.

9. A collector according to claim 8, wherein the end portion of the outgoing optical wave guide tapers towards its end.

10. A collector according to claim 9, wherein the seat is defined by an inner surface of the collector which is arranged at least approximately perpendicular to at least one or to both of the light-conducting lateral faces of the optical body.

11. A collector according to claim 8, wherein the seat is defined by an inner surface of the collector which is arranged at least approximately perpendicular to at least one or to both of the light-conducting lateral faces of the optical body.

12. A collector according to claim 1, wherein the first coupling points each have a longitudinal center line and the longitudinal center line of the first coupling points intersects the output cross-sectional area of the second coupling point.

13. A collector according to claim 1, wherein the output cross-sectional area of the collector is greater than or equal to an average input cross-sectional area of the first coupling points.

14. A collector according to claim 1, wherein the second coupling point includes a light outcoupling surface which is arranged in such a manner that the outcoupled light is vertically incident on this surface or at an angle of 60-120°.

15. A collector according to claim 1, wherein the inner or the outer lateral surfaces or the inner and the outer lateral surfaces each include an apex angle of a cone of approximately 90-150°.

16. A collector according to claim 1, wherein the first coupling points are each designed as outwardly projecting appendices of the collector.

17. A collector according to claim 1, wherein the optical body is formed integrally with the first or the second coupling points or with the first and the second coupling points.

18. A device including at least one light-optical apparatus, wherein the device comprises at least one collector as defined in the claim 1, wherein the device includes an installation arranged upstream of the collector and including the incoming optical waveguides, the installation comprising light-generating or light-collecting apparatus for feeding the light to the ingoing optical waveguides, or wherein the device includes an installation arranged downstream of the collector and including the outgoing optical waveguide for further processing or utilizing the light, or wherein the device includes in combination an installation arranged upstream of the collector and including the incoming optical waveguides and an installation arranged downstream of the collector and including the outgoing optical waveguide.

19. The device according to claim 18, wherein the installation which is arranged downstream of the collector and includes the outgoing optical waveguide is an illumination device, energy converting device or a device for transmitting a light-optical signal.

* * * * *